L. LITTLEJOHN.
Securing Hubs to Axles.
No. 103,900.               Patented June 7, 1870.
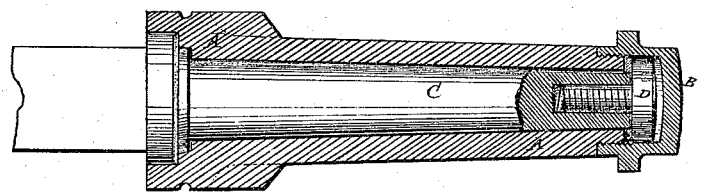

United States Patent Office.

LOMAX LITTLEJOHN, OF NEW YORK, N. Y.

Letters Patent No. 103,900, dated June 7, 1870.

IMPROVEMENT IN CARRIAGE-AXLES.

The Schedule referred to in these Letters Patent and making part of the same.

*To all whom it may concern:*

Be it known that I, LOMAX LITTLEJOHN, of the city of New York, in the county and State of New York, have invented a new and useful Improvement in Carriage-Axles; and I do hereby declare that the following is a full, clear, and exact description thereof, which will enable others skilled in the art to make and use the same, reference being had to the accompanying drawing forming part of this specification.

The figure is a longitudinal section of the box and axle to which my improvement has been applied, part of said axle being broken away to show the construction.

This invention relates to devices employed to retain the axle and axle-box of a vehicle in their proper relative position, and consists in forming a threaded recess in the end of the axle, and fitting thereto the shank of a screw with a broad head, whose under surface overlaps the annular end of the box, and prevents it from working off.

A is the axle-box, which is provided with a cap-nut, B, in the ordinary manner.

C is the axle, in the forward end of which is formed a hole or recess, having a screw-thread cut in its surface.

D is a male nut, the screw of which screws into the recess in the end of the axle C, and the outer end of which has a head formed upon it of such a size as to extend beyond the axle C and overlap the end of the axle-box A, as shown in the figure, so as to keep the said box in place upon the said axle, the cap-nut B being only required for keeping out dirt, and giving a finish to the outer end of the axle.

Having thus described my invention,

I claim as new and desire to secure by Letters Patent—

The combination of the broad-headed screw D with the recessed and threaded axle-end, for the purpose of holding the axle-box in place, as set forth.

The above specification of my invention signed by me this 15th day of March, 1870.

LOMAX LITTLEJOHN.

Witnesses:
GEO. W. MABEE,
JAMES T. GRAHAM.